US010387456B2

United States Patent
Moskwinski et al.

(10) Patent No.: US 10,387,456 B2
(45) Date of Patent: Aug. 20, 2019

(54) SYSTEMS AND METHODS FOR RECORDS TAGGING BASED ON A SPECIFIC AREA OR REGION OF A RECORD

(71) Applicant: Ripcord Inc., Hayward, CA (US)

(72) Inventors: Michael Moskwinski, Hayward, CA (US); Alex Fielding, Hayward, CA (US); Kevin Christopher Hall, Hayward, CA (US); Kimberly Lembo, Hayward, CA (US)

(73) Assignee: RIPCORD INC., Hayward, CA (US)

(*) Notice: Subject to any disclaimer, the term of this patent is extended or adjusted under 35 U.S.C. 154(b) by 0 days.

(21) Appl. No.: 15/849,159

(22) Filed: Dec. 20, 2017

(65) Prior Publication Data

US 2018/0129729 A1    May 10, 2018

Related U.S. Application Data

(63) Continuation of application No. PCT/US2017/046053, filed on Aug. 9, 2017.

(60) Provisional application No. 62/372,556, filed on Aug. 9, 2016.

(51) Int. Cl.
*G06F 16/00*    (2019.01)
*G06F 16/28*    (2019.01)
*G06F 16/901*    (2019.01)
*G06F 7/00*    (2006.01)
*G06F 16/13*    (2019.01)
*G06N 20/00*    (2019.01)

(52) U.S. Cl.
CPC ............. *G06F 16/287* (2019.01); *G06F 7/00* (2013.01); *G06F 16/13* (2019.01); *G06F 16/9024* (2019.01); *G06N 20/00* (2019.01)

(58) Field of Classification Search
CPC ............. G06F 19/28; G06F 17/30312; G06F 17/30569; G06F 17/30616; G06F 17/30011; G06F 17/30321; G06F 17/30253
See application file for complete search history.

(56) References Cited

U.S. PATENT DOCUMENTS

| | | | |
|---|---|---|---|
| 6,038,295 A | * | 3/2000 | Mattes ................ H04M 3/4938 |
| | | | 348/211.3 |
| 7,188,107 B2 | | 3/2007 | Moon et al. |
| 7,899,816 B2 | | 3/2011 | Kolo et al. |
| 8,724,907 B1 | | 5/2014 | Sampson et al. |
| (Continued) | | | |

FOREIGN PATENT DOCUMENTS

WO    WO-2017033200 A1    3/2017

OTHER PUBLICATIONS

International Search Report and Written Opinion dated Oct. 23, 2017 for International PCT Patent Application No. PCT/US2017/046053.

*Primary Examiner* — Yicun Wu
(74) *Attorney, Agent, or Firm* — Wilson, Sonsini, Goodrich & Rosati

(57) ABSTRACT

Provided are systems and methods for classifying and tagging records in a record management system using information extracted and analyzed from specific areas or regions of records. A specific area or region of the record may be scanned, and the content disposed therein processed against a plurality of classification templates. Based on proximity to the classification templates, the record may be assigned one or more tags corresponding to the classification templates.

18 Claims, 6 Drawing Sheets

(56) References Cited

U.S. PATENT DOCUMENTS

| | | |
|---|---|---|
| 8,805,840 B1 | 8/2014 | Joshi et al. |
| 9,589,184 B1 | 3/2017 | Castillo et al. |
| 2005/0185841 A1* | 8/2005 | Tyan ................ G06F 17/30253 382/181 |
| 2007/0168382 A1* | 7/2007 | Tillberg ............ G06F 17/30253 |
| 2008/0281831 A1* | 11/2008 | Mindrum ............... G06Q 10/10 |
| 2009/0326709 A1* | 12/2009 | Hooper ............. G06F 17/30011 700/245 |
| 2010/0235367 A1 | 9/2010 | Chitiveli et al. |
| 2014/0046954 A1 | 2/2014 | MacLean et al. |
| 2015/0039651 A1 | 2/2015 | Kinsely et al. |
| 2016/0147863 A1 | 5/2016 | Anantharangachar et al. |

* cited by examiner

| Tag | Description |
|-----|-------------|
| CC | Coordinating conjunction |
| CD | Cardinal number |
| DT | Determiner |
| EX | Existential *there* |
| FW | Foreign word |
| IN | Preposition or subordinating conjunction |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |

| Tag | Description |
|-----|-------------|
| PRP$ | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, past participle |
| VBP | Verb, non-3rd person singular present |
| VBZ | Verb, 3rd person singular present |
| WDT | Wh-determiner |
| WP | Wh-pronoun |
| WP$ | Possessive wh-pronoun |
| WRB | Wh-adverb |

*FIG. 3*

SYSTEMS AND METHODS FOR RECORDS TAGGING BASED ON A SPECIFIC AREA OR REGION OF A RECORD

CROSS REFERENCE

This application is a continuation of International Application No. PCT/US2017/046053, filed Aug. 9, 2017, which claims the benefit of U.S. Provisional Application No. 62/372,556, filed Aug. 9, 2016, each of which applications is entirely incorporated herein by reference.

BACKGROUND OF THE INVENTION

Information can often be stored on physical document files. However, such physical storage systems can demand the availability of extremely large volumes of space for indefinite durations. For example, physical document files may be packed away in archives, warehouses, libraries, and/or vaults. The physical documents, once stored, may also require routine maintenance, such as to prevent damage, destruction, or deterioration (e.g., natural deterioration) of the documents. Furthermore, access of information stored on physical document files may be costly and time consuming. Not only can the physical documents be difficult to locate and transport, but once the physical documents have been identified, extracting the information from the physical files can also be time consuming as well.

As an alternative, information from the physical documents may be transferred to an electronic medium, and stored in memory. In some instances, information can be created and stored electronically. This can obviate the need for storage space and maintenance during storage.

SUMMARY OF THE INVENTION

Even stored as electronic records, specific information and/or documents may be difficult to locate and isolate when there is a myriad of other electronic files to sort through. For large-scale record management systems that can hold up to, or more than, tens of millions of records, for example, traditional methods of classification, such as the manual mapping of records to components of taxonomy, can be very inefficient. Recognized herein is a need for systems and methods for efficient and accurate classification and tagging of electronic records and accurate retrieval of the same thereafter.

Provided are systems and methods for classifying and tagging records in a record management system using information extracted and analyzed from specific areas or regions of electronic records. In some instances, the electronic records can be classified and tagged. In some instances, the specific areas or regions in the electronic records can be classified and tagged. A record and/or area or region may be classified and tagged with one or more elements of record taxonomy. Such classification and tagging may be based at least partly on and be compatible with natural language. Such classification and tagging may be based at least partly on and be compatible with user activities and/or record activities. Beneficially, the records classified and tagged using the systems and methods provided herein may thereafter be retrieved based on user activities and/or record activities, which may provide more contextual relevance than, for example, search keywords. The systems and methods herein may allow for the training of a record management system for unsupervised and automated tagging.

In an aspect, provided is a computer-implemented method for classifying an electronic record, comprising: accessing, with aid of one or more computer processors, a library of classification templates, wherein each classification template of the library of classification templates comprises one or more tags and one or more classification units, wherein a classification unit comprises (i) an area or region of the electronic record and (ii) a classification method; matching the electronic record with a first classification template of the library of classification templates; determining a template proximity score for the first classification template for the electronic record, wherein the template proximity score is based at least in part on the classification method applied to content disposed in the area or region in the electronic record; and assigning the one or more tags of the first classification template to the electronic record based at least in part on the template proximity score.

In some embodiments, the method can further comprise repeating the above for a second classification template of the library of classification templates.

In some embodiments, the one or more tags of the first classification template is assigned to the electronic record if the template proximity score is greater than a predetermined threshold score.

In some embodiments, at least two classification templates share the same classification unit.

In some embodiments, the method can further comprise determining a unit proximity score for each classification unit in the first classification template, wherein the unit proximity score is based at least in part on the classification method of the classification unit applied to content disposed in the area or region of the classification unit in the electronic record, and wherein the template proximity score is an aggregate of the unit proximity scores determined for each classification unit.

In some embodiments, the classification method is at least one member of the group consisting of (i) a pattern of regular expression, (ii) a pattern of part-of-speech, and (iii) one or more classification algorithms.

In some embodiments, the unit proximity score is binary.

In some embodiments, the method can further comprise receiving instructions for assigning a first tag to the electronic record from a user; assigning the first tag to the electronic record; storing, in one or more databases, content of the electronic record as training material for classifying as the first tag; and learning a classification method of electronic records as the first tag from the training material.

In some embodiments, the library of classification templates is accessed from a graph database, wherein the graph database comprises the library of classification templates and a library of classification units.

In some embodiments, matching the electronic record with the first classification template of the library of classification templates comprises, for each classification unit of the first classification template, applying the classification method to content disposed in the area or region of the electronic record.

In another aspect, provided is a computer system for classifying an electronic record, comprising: one or more processors; and a memory, communicatively coupled to the one or more processors, including instructions executable by the one or more processors, individually or collectively, to implement a method for classifying an electronic record, the method comprising: receiving, from a user, over a computer network, a definition for a classification template, wherein a classification template is defined by one or more tags and one or more classification units, wherein a classification unit is defined by at least (i) an area or region of the electronic record and (ii) a classification method; matching the electronic record with the classification template; determining a template proximity score for the classification template for the electronic record, wherein the template proximity score is based at least in part on the classification method applied to content disposed in the area or region of the electronic record; and assigning the one or more tags of the classification template to the electronic record based at least in part on the template proximity score.

In some embodiments, the method further comprises repeating determining a unit proximity score for each classification unit in the classification template, wherein the unit proximity score is based at least in part on the classification method of the classification unit applied to content disposed in the area or region of the classification unit in the electronic record, and wherein the template proximity score is an aggregate of the unit proximity scores determined for each classification unit.

In some embodiments, the one or more tags of the first classification template is assigned to the electronic record if the template proximity score is greater than a predetermined threshold score.

In some embodiments, the classification unit further comprises a page index and dimensions.

In some embodiments, the method further comprises displaying, on a graphical user interface, one or more pages of the electronic record.

In some embodiments, the definition is received from the graphical user interface.

In some embodiments, a definition for the area or region of the electronic record is displayed over the one or more pages of the electronic record on the graphical user interface.

In some embodiments, the classification method is at least one member of the group consisting of (i) a pattern of regular expression, (ii) a pattern of part-of-speech, and (iii) one or more classification algorithms.

In some embodiments, the method further comprises: receiving instructions for assigning a first tag to the electronic record from a user; assigning the first tag to the electronic record; storing, in one or more databases, content of the electronic record as training material for classifying as the first tag; and learning a classification method of electronic records as the first tag from the training material.

In some embodiments, the library of classification templates is accessed from a graph database, wherein the graph database comprises the library of classification templates and a library of classification units.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 shows examples of part-of-speech tags.

DETAILED DESCRIPTION OF THE INVENTION

Figure 1:
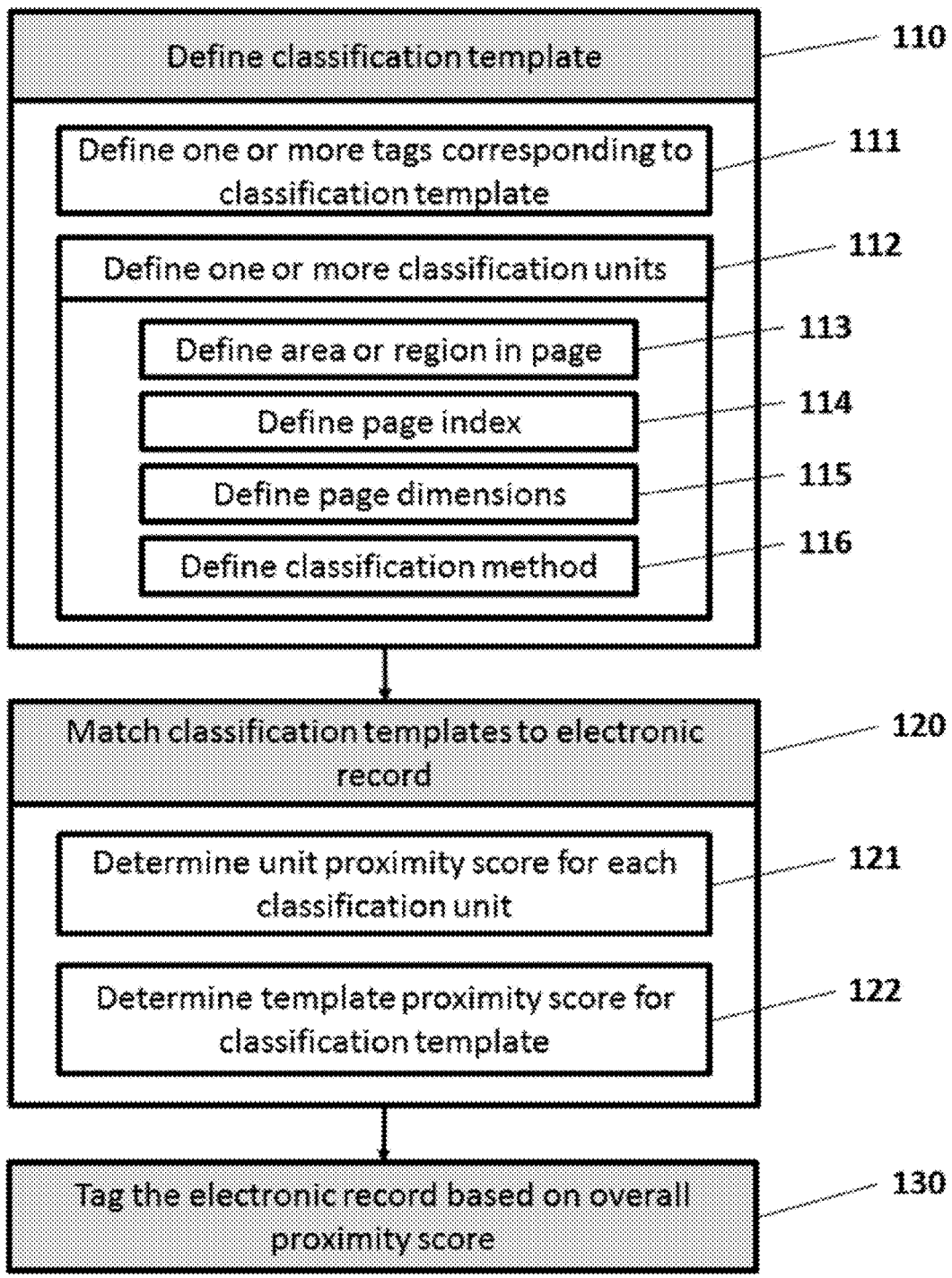
FIG. 1 illustrates a simplified flowchart of a method for classifying and tagging records in a record management system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Immense amounts of information can be stored on physical documents, both by governmental agencies and private and public entities. Such documents can be kept in massive archives, warehouses, libraries, and/or vaults. However, physical documents may be difficult to locate, access, search, and/or manipulate manually. Furthermore, it may be difficult to locate, access, search, and/or extract information from such physical documents. Manual methods can be costly, inefficient, unreliable and/or subject to privacy concerns. For example, human handling of large amounts of documents may be slow, prone to error, damaging to human health due to exposure to chemicals in the documents and exposure to fasteners, damaging to the documents, and/or be susceptible to security leaks when documents containing sensitive information are involved. Locating particular documents and/or transportation of such documents may be laborious and costly. Storage of information on physical documents may also be prone to loss, such as when the physical documents are lost, damaged, otherwise materially degraded (e.g., fading ink, weakened integrity of sheets, etc.), destroyed and/or mislabeled. For at least the reasons described herein, extraction of information stored on physical documents may be difficult, thereby hindering or preventing access to an immense amount of stored information.

Conversion of the information stored on physical documents to digital information can make the information easily accessible through digital searching. For example, the physical documents can be digitally scanned or otherwise imaged, such as with a camera or other imaging device or optical sensor. In some instances, large volumes of physical documents (e.g., millions) can be converted to electronic records via automated or semi-automated systems and methods. Such automated or semi-automated systems and methods can be configured to process large volumes of physical documents efficiently and with substantial uniformity, such as by automating one or more processes (e.g., sorting disorganized document stacks, isolating sheets from document stacks, unfastening fasteners affixed to one or more sheets, feeding a document into a device, scanning a document, orienting a document, disposing of scanned documents, etc.) otherwise manually performed during conversion of a physical document to an electronic record. The systems and methods described herein can be part of an automated end-to-end process involving the conversion of physical documents to electronic records, and subsequent classification and tagging of the electronic records.

In some instances, the digitized information can be further processed, such as undergoing text recognition (e.g., optical character recognition (OCR)). The digitized information can be stored in an on-site or remote server at a secured location, and/or may be easily and reliably duplicated upon request. Digitization of the information can improve reliability, reduce costs, and/or avoid exposure of sensitive information. However, while digital information may be more easily searched than information stored on physical documents, and can be easily sent to a target destination after digitization, even as electronic records, specific information and/or documents may be difficult to locate and isolate when there is a myriad of other electronic records to sort through.

Provided are systems and methods for facilitating classification and tagging in an electronic records management system or otherwise an electronic documents management system. The systems and methods described herein can apply to both electronic records that have been converted (e.g., digitally scanned or otherwise imaged) from physical files and electronic records that have been created and stored as electronic files. The systems and methods described herein can apply to any electronic record or electronic document.

Provided are systems and methods for classifying and tagging records in a record management system using information extracted and analyzed from specific areas or regions of electronic records. In some instances, the electronic records can be classified and tagged. In some instances, the specific areas or regions in the electronic records can be classified and tagged. A record and/or area or region may be classified and tagged with one or more elements of record taxonomy. Such classification and tagging may be based at least partly on and be compatible with natural language. Such classification and tagging may be based at least partly on and be compatible with user activities and/or record activities. Beneficially, the records classified and tagged using the systems and methods provided herein may thereafter be retrieved based on user activities and/or record activities, which may provide more contextual relevance than, for example, search keywords. The systems and methods herein may allow for the training of a record management system for unsupervised and automated tagging.

FIG. 1 illustrates a simplified flowchart of a method for classifying and tagging records in a record management system.

A method for classifying and tagging an electronic record in a record management system can generally comprise the operations of defining 110 classification templates, matching 120 the electronic record against the defined classification templates, and tagging 130 the electronic record based on the matching. These operations will be described in detail below.

A record management system can comprise a plurality of electronic records. The record management system described herein can comprise any number of electronic records. For example, the records management can comprise at least 1, 10, 100, $10^3$, $10^4$, $10^5$, $10^6$, $10^7$, $10^8$, $10^9$, $10^{12}$, $10^{15}$, or more electronic records. An electronic record can be any digital record containing information, such as, for example, text and/or images. An electronic record can be an electronic document or an excerpt (e.g., words, phrases, sentences, paragraphs, sections, chapters, pages, other segments, etc.) from an electronic document. An electronic record can be a digital image of a physical document or of an excerpt from a physical document. An electronic record can be a post, a list, a comment, a note, a pamphlet, a guide, a manual, a photograph, a picture, an image, a graphic, a graph, a table, a chart, a blog, a website, an article, any text and/or images, any other information, and/or a combination thereof available offline and/or online (e.g., such as on the Internet) electronically.

A classification template can be created and/or defined by a user. The user may or may not be a user of the record management system. For example, a user can be an operator, manager, or administrator of the record management system. A user can be a customer of the record management system. A user can be a provider of documents and/or records to the record management system. A user can be a creator of documents and/or records to the record management system. A user can be an individual. A user can be an entity. A user can be a plurality of individuals. A user can be a plurality of entities. In some instances, the record management system may identify users by unique identifiers (e.g., user name, user account, user ID, etc.).

In some instances, a classification template can be stored in a classification template library. The classification template library may be stored in memory of a computer system (e.g., server), such as in one or more databases. The classification template library may be stored in a graph database, as described further below. For example, any classification template created by a user may be saved and stored in the classification template library for use by the system (e.g., record management system). A classification template can correspond to one or more tags 111 and be defined by one or more classification units 112.

A tag can be a label used to describe an electronic record. A tag can be a label used to group different electronic records with a common theme. A tag can be a text string. A tag can be a numerical value. A tag can be a keyword and/or phrase. A tag can be a name. A tag can be a rating. A tag can be a category, group, topic, and/or type. A tag can be a note. A tag can be one or more components of unstructured taxonomy. A tag can be standardized information. A tag can be any metadata field for an electronic record or file. A tag may be stored as a metadata field for an electronic record, such as when assigned to the electronic record. In some instances, a tag can be binary (e.g., yes/no, o/x, 0/1, etc.). A tag may be assignable to and/or removable from an electronic record. A tag may be used to index an electronic record. A tag may be used to identify a group of records. A tag may be used to classify an electronic record. A tag may be used to search and filter electronic records. A tag may be changed, modified, and/or otherwise updated. In some instances, a tag may be changed, modified, and/or otherwise updated while assigned to one or more electronic records.

A classification template can correspond to one or more tags 111. In some instances, a classification template can correspond to only one tag. In some instances, a classification template can correspond to at least 2, 3, 4, 5, 6, 7, 8, 9, 10, 15, 20, 25, 30, 35, 40, 45, 50, 100, or more tags. In some instances, a classification template can correspond to at most 100, 50, 45, 40, 35, 30, 25, 20, 15, 10, 9, 8, 7, 6, 5, 4, 3, 2, or 1 tag(s). In some instances, there may exist at least one classification template corresponding to each tag. A plurality of classification templates can correspond to the same tag and/or same group of tags. By way of example, a first classification template can correspond to the tags of 'sports,' 'healthy lifestyle,' and 'food,' a second classification template can correspond to the tags of 'bamboo,' and a third classification template can correspond to the tags of 'trees,' 'bamboo,' 'olives,' and 'food.' In another example, an electronic record for a specific supplier or merchant can have be assigned the following tags: a tag identifying the type of electronic record (e.g., invoice), a tag identifying the customer (e.g., customer name), a tag identifying the content (e.g., product sold), a tag identifying the time of record generation (e.g., year, month, day, time, etc.) and other tags.

A classification template can be defined by one or more classification units 112. A classification unit can be defined by an area or region in an electronic record 113, a page index 114, dimensions 115, and a classification method 116. A classification unit can be created and/or defined by a user. The user may or may not be a user of the record management system. In some instances, a classification unit can be stored in a classification unit library. The classification unit library may be stored in memory of a computer system (e.g., server), such as in one or more databases. The classification unit library may be stored in a graph database, as described further below. The same database may store the classification unit library and the classification template library. For example, any classification unit created by a user may be saved and stored in the classification unit library for use by the system (e.g., record management system). The same classification unit may define different classification templates.

In some instances, a classification template can be defined by only one classification unit. In some instances, a classification template can be defined by at least 2, 3, 4, 5, 6, 7, 8, 9, 10, 15, 20, 25, 30, 35, 40, 45, 50, 100, or more classification units. In some instances, a classification template can be defined by at most 100, 50, 45, 40, 35, 30, 25, 20, 15, 10, 9, 8, 7, 6, 5, 4, 3, 2, or 1 classification unit(s).

The area or region 113 can be on any page or other sub-unit (e.g., chapter, section, paragraph, sentence, etc.) of the electronic record. An area or region in an electronic record may have any shape. For example, the area or region can be rectangular or circular. The area or region may be polygonal, or be any other arbitrary shape. In some instances, a user may select a pre-provided shape (e.g., rectangle, parallelogram, circle, trapezoid, hexagon, etc.) to define the area or region on a page of the electronic record. In some instances, the user may provide coordinates, dimensions, and/or measurements for a shape. In some instances, the coordinates, dimensions, and/or measurements can be relative to a reference point or dimension (e.g., a corner, an edge, a midpoint of an edge, a center of the page or sub-unit, a width, a length, a hypotenuse, a diameter, a radius, a perimeter, a diagonal, an area, a percentage of a width, a percentage of a length, a percentage of a hypotenuse, a percentage of a diameter, a percentage of a radius, a percentage of a perimeter, a percentage of a diagonal, a percentage of an area, etc.). In some instances, the area or region can be defined relative to a line number (e.g., from lines 5-17) or other unit of the page (e.g., columns 2-4, rows 3-5, etc.). In some instances, the area or region can be the whole page. In some instances, the area or region can span more than one page. In some instances, the area or region can be less than a page.

In some instances, the user may draw a custom shape. In some instances, the user may define the area or region on a graphical user interface displaying a page or other sub-unit of the electronic record in which the area or region is to be defined, such as by previewing an outline of the shape of the area or region on the page or other sub-unit. The graphical user interface may display a page, a plurality of pages, or other sub-unit of the electronic record to a user. On the graphical user interface, the user may select and/or hand draw the area or region, such as by dragging-and-dropping a pre-defined shape, clicking-and-dragging to draw a shape, and/or other methods of user interaction (e.g., click, touch, tap, drag, hold, drop, swipe, double-click, triple-click, scroll, expand, pinch, etc.) available. In some instances, the graphical user interface may display a toolbox, a toolbar, a sidebar, a menu, an option, or the like of actions available to the user (e.g., select a shape template, draw a shape, start editing, finish editing, etc.).

In some instances, the user may define a classification template and/or a classification unit on a web-based interface. The user may upload an electronic file (e.g., PDF file, doc file, jpeg file, etc.) to the system. The user may draw shapes and/or add other definitions using tools, such as those described above, on the interface to define the area or region. Once the area or region has been defined, the user may continue to define the classification unit, such as by defining a classification method or once a shape has been drawn on the screen, user can define other properties of the classification unit, such as the method of classification or a predetermined threshold score, which will be described below.

Figure 2:
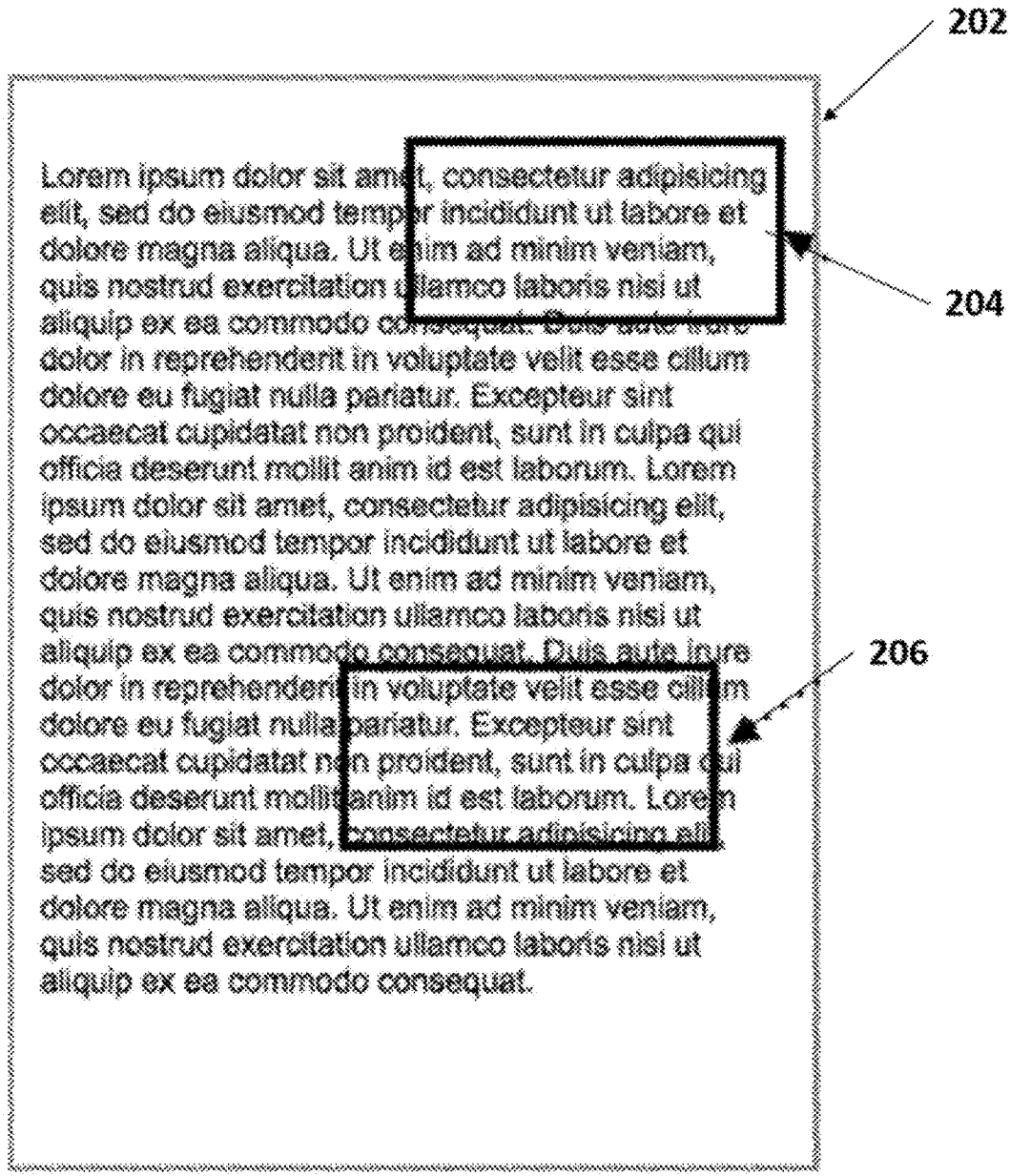
FIG. 2 illustrates an example of an area or region in an electronic record.

FIG. 2 illustrates an example of an area or region in an electronic record. A page 202 of an electronic record may have two classification units, a first classification unit having a first rectangular region or area 204 and a second classification unit having a second rectangular region or area 206.

The page index 114 can be an index of a page of the electronic record containing the area or region 113. In some instances, the page index can be alphanumerical. In some instances, the page index can be a page number of the electronic record. In some instances, the page index can be an order of the pages (e.g., fifth page of the electronic record can have a page index of 5 even though page number is 11). A classification template can comprise classification units defining areas or regions on different pages. For example, a classification template comprising three classification units can have first and second classification units defining two different areas or regions on a third page (e.g., with page index of 3) of an electronic record and a third classification defining a different area or region on a seventeenth page (e.g., with page index of 17). As will be described further below, when an electronic record is matched against a classification template, each area or region defined by the classification units in the classification template can be analyzed, whether on the same or different pages of the electronic record.

The dimensions 115, as explained above, can be a dimension for the area or region 113. The dimensions can be in any unit (e.g., inches, feet, centimeters, meters, centimeters, millimeters, quarter inches, etc.).

A classification unit can be defined by a classification method 116. A classification method can utilize a pattern of regular expression. A classification method can utilize a pattern of part-of-speech tagged text. A classification method can utilize one or more other classification algorithms (e.g., labeling algorithm, information extraction algorithm, reduced regular expression, Naïve Bayes, Max Entropy, Boosted Trees, Random Forest, etc.). A classification method can utilize a combination of the above. The classification method can use natural language processing (NLP) classification methods and/or algorithms. Beneficially, a classification template having a plurality of classification units may classify an electronic record using different classification methods.

When a classification template is matched 120 against an electronic record, as described further below, application of a classification method to an area or region of a classification unit of the classification template may determine 121 a unit proximity score for the classification unit. In some instances, a unit proximity score can be based at least in part on a minimum threshold score for the unit. The minimum threshold score can be user-defined and/or pre-programmed. The unit proximity score for the classification template may be combined to determine 122 a template proximity score for the classification template. The template proximity score determined for a classification template matched against an electronic record can determine whether the one or more tags corresponding to that classification template is assigned to the electronic record.

A classification method can utilize a pattern of regular expression. A pattern of regular expression (e.g., regex, regexp, etc.) can be a special text string for describing a search pattern. Regular expression can be a pattern describing a certain amount of text. By way of example, a pattern of "\b[A-Z0-9._%+-]+@[A-Z0-9.-]+\.[A-Z]{2,}\b" can describe an email address. This pattern can be used to search through text (e.g., strings, character strings) to find email addresses or strings resembling email addresses in the text. When the classification method utilizing a pattern of regular expression is applied to a classification unit, text positioned or otherwise disposed in the specified area or region of the classification unit can be searched for strings of the pattern of regular expression. In some instances, scoring based on a classification method utilizing a pattern of regular expression can be binary (e.g., 0 or 1), such that a score of 1 is determined when there is at least one match (e.g., one or more email addresses found) and a score of 0 is determined when there is no match (e.g., no email address found). Alternatively or in addition, scoring based on a classification method utilizing a pattern of regular expression can be based on non-binary scales, such as frequency of matches, a score out of a maximum numerical (e.g., out of 1, 2, 3, 4, 5, 6, 7, 8, 9, 10, 20, 30, 40, 50, 60, 70, 80, 90, 100, 200, 300, 400, 500, 1000, etc.), in percentages or fraction, or any other scoring system. For example, a unit proximity score can be higher for a classification unit containing strings with the pattern of regular expression with more frequency (e.g., 7 email addresses) than for a classification unit containing string with the pattern of regular expression with less frequency (e.g., 2 email addresses).

A classification method can utilize a pattern of part-of-speech. A pattern of part-of-speech can comprise text tagged with parts of speech (e.g., common noun, plural common noun, proper noun, modal verb, base verb, adjective, comparative adjective, etc.) and fixed keywords. By way of example, a pattern of "looking/VBG, for/IN, [NN], . . . , in/IN, [NN], . . . " can have the tags VBG (verb gerund), IN (preposition or subordinating conjunction), and NN (common noun). Examples of other part-of-speech tags are shown in FIG. 3. Parts-of-speech tags are not limited to those shown in FIG. 3. When the classification method utilizing a pattern of part-of-speech is applied to a classification unit, text positioned or otherwise disposed in the specified area or region of the classification unit can be searched for fixed keywords, and the matched text can be tagged with the part-of-speech tags.

As an example, a part-of-speech tagged pattern can be: "form/NN [CD]." In this example, there is a qualified noun: "form," followed by any number, "[CD]." Another more complex example of a part-of-speech tagged pattern can be: "[NN] [VBG] tax/NN records/NNS." In this case, the first token is an unqualified noun, "[NN]," followed by an unqualified verb, "[VBG]," and two qualified nouns "tax/NN" and "records/NNS." A user may define the weights for each token in a pattern such that the total weight of the pattern is 1. The token weights can determine how specific patterns are scored to determine a pattern proximity score, which can be compared to a minimum threshold score for the classification unit. The unit proximity score can be based at least in part on the pattern proximity score. Expanding on the pervious example, the same pattern with weight definitions can be: "[NN-0.2] [VBG-0.1] tax/NN-0.4 records/NNS-0.3," where the unqualified noun of [NN] has a weight of 0.2, the unqualified verb of [VBG] has a weight of 0.1, the qualified noun of "tax/NN" has a weight of 0.4, and the qualified noun of "records/NNS" has a weight of 0.3. The user may further define a minimum threshold for the acceptance of text as conforming to the pattern, such as 0.8. A stricter minimum threshold of 1 may require that the text conform exactly to the pattern of part-of-speech. In some instances, a minimum threshold of 0 may allow the classification method to accept text of any pattern regardless of conformity to the part-of-speech tagged pattern. The user may define any minimum threshold value.

Classification utilizing a pattern of part-of-speech can begin with the system automatically tagging extracted text (e.g., from text positioned or otherwise disposed in the specified area or region of the classification unit) with parts-of-speech tags. After tagging, the text can be tokenized into tokens containing keywords and part-of-speech tags. For example, the following text, "information containing tax records," can be tagged and tokenized into "information/NN, containing/VBG, tax/NN, records/NNS." Once the text has been tagged and tokenized, the system can score the text by first determining if the pattern defined in the classification unit exists in the text. The text can be compared to individual tokens. If one or more individual tokens match, the weight associated with the individual tokens in a pattern can be aggregated to determine a pattern proximity score. Once all tokens have been processed, the pattern proximity score can be compared to the minimum threshold value. In some instances, if the pattern proximity score is at or higher than the minimum threshold value, the classification unit can receive the unit proximity score of 1, and otherwise a 0. In some instances, the unit proximity score can be non-binary. For example, the unit proximity score can be based at least in part on the pattern proximity score.

A classification method can utilize other classification algorithms, such as Naïve Bayes, Maximum Entropy, Boosted Trees, Random Forest classifiers. The classification algorithms can be labeling algorithms, information extraction algorithms, other patterns (e.g., reduced regular expression, etc.), NLP algorithms, and/or other algorithms. When the classification method utilizing one or more classification algorithms is applied, text positioned or otherwise disposed in the specified area or region of the classification unit can be classified and scored according to the algorithms. In some instances, the scoring can be binary (e.g., 0 or 1). Alternatively or in addition, scoring can be based on non-binary scales, such as frequency of matches, a score out of a maximum numerical (e.g., out of 1, 2, 3, 4, 5, 6, 7, 8, 9, 10, 20, 30, 40, 50, 60, 70, 80, 90, 100, 200, 300, 400, 500, 1000, etc.), in percentages or fraction, or any other scoring system. In some instances, a user may define a predetermined threshold for the unit proximity score, which can be used to determine the template proximity score. The predetermined threshold can be minimum and/or maximum score.

Referring back to FIG. 1, once unit proximity scores are determined 121 for each classification unit in the classification template for an electronic record, the template proximity score for the classification template can be determined from the individual unit proximity scores. The template proximity score can be an aggregate score of the individual unit proximity scores. The following aggregated score methodology can be used to determine the template proximity score. The system may, for example, utilize a classic vector cosign similarity algorithm:

$$sim(d_j, q) = \frac{d_j \cdot q}{\|d_j\|\|q\|} = \frac{\sum_{i=1}^{N} w_{i,j} w_{i,q}}{\sqrt{\sum_{i=1}^{N} w_{i,j}^2} \sqrt{\sum_{i=1}^{N} w_{i,q}^2}}$$

Where unit proximity scores are binary, during template processing, the score of each classification unit that has met the minimum threshold score can be added as classification vectors with 1's and the score of each classification unit that has not met the minimum threshold score can have 0's. The classification vector can be compared against the control vector that has 1's for each classification unit. The above vector cosign algorithm can calculate the similarity between the two vectors to determine a template proximity score. Alternatively or in addition, other methodologies can be used to determine the template proximity score.

Relationships between classification units and classification templates can be stored in a graph based data structure with classification templates and classification units as nodes connected to each other via proximity relationships, as described further below. In some instances, due to a feedback process (e.g., feedback loop) that adjusts the proximity relationships between the classification units and the classification templates, outlying classification units with low proximity scores in the classification template may be excluded from the aggregated score formula determining the template proximity score.

The template proximity score can be indicative of a proximity between the electronic record and the one or more tags corresponding to the classification template. The electronic record may be tagged 130 by the one or more tags corresponding to the classification template based at least in part on the template proximity score. For example, the template proximity score for a classification template may be compared to a predetermined threshold score, wherein an electronic record is tagged with the one or more tags corresponding to the classification template only if the template proximity score is at or above the predetermined threshold score (e.g., 0.95, etc.), and not tagged otherwise. In some instances, the user may define the predetermined threshold score for the record management system. In some instances, a default threshold score (e.g., 0.8, 50, 70, 85, 50%, 70%, 85%, etc.) can be the predetermined threshold score for the system. In some instances, a user-defined predetermined threshold score can override the default threshold score.

During the process of classification, an electronic record can be matched against a plurality of classification templates. In some instances, an electronic record can be matched against all classification templates in the classification template library of the record management system. Beneficially, the electronic record may be assessed for proximity to all tags in the system before it is classified and tagged. In some instances, all electronic records in the record management system can be matched against each classification template in the classification template library. In some instances, if an electronic record is assigned a tag that corresponds to a plurality of classification templates, the system may thereafter skip or otherwise forego matching the electronic record with classification templates corresponding to the same tag. Beneficially, this may save processing capacity of the system and shorten classification time.

In some instances, a classification unit may be defined by more than one area or region. For example, the classification method for a classification unit may apply to all areas or regions of the classification unit.

As described above, a classification template may be stored in a classification template library. For example, any classification template created by a user may be saved and stored in the classification template library for use by the system (e.g., record management system). In some instances, the classification template library can be specific to a user (e.g., customer of a record management system). In such cases, classification templates created by the user may be saved and made available only to the user and/or the user's electronic records. Alternatively or in addition, all classification templates may be available to all users of the record management system. Advantageously, this allows the system to apply the same standard (e.g., defined in the classification template) to each electronic record when classifying different electronic records for the same tags. Furthermore, a user need not redundantly re-define classification methods and/or details on the application of classification methods for each tag.

As described above, a classification unit may be stored in a classification unit library. For example, any classification unit created by a user may be saved and stored in the classification unit library for use by the system (e.g., record management system). The same classification unit may define different classification templates. In some instances, the classification unit library can be specific to a user (e.g., customer of a record management system). In such cases, classification units created by the user may be saved and made available only to the user, the user's classification templates, and/or the user's electronic records. Alternatively or in addition, all classification units may be available to all users of the record management system. Advantageously, a user need not redundantly re-define classification methods and/or details on the application of classification methods for each classification template.

Figure 4:
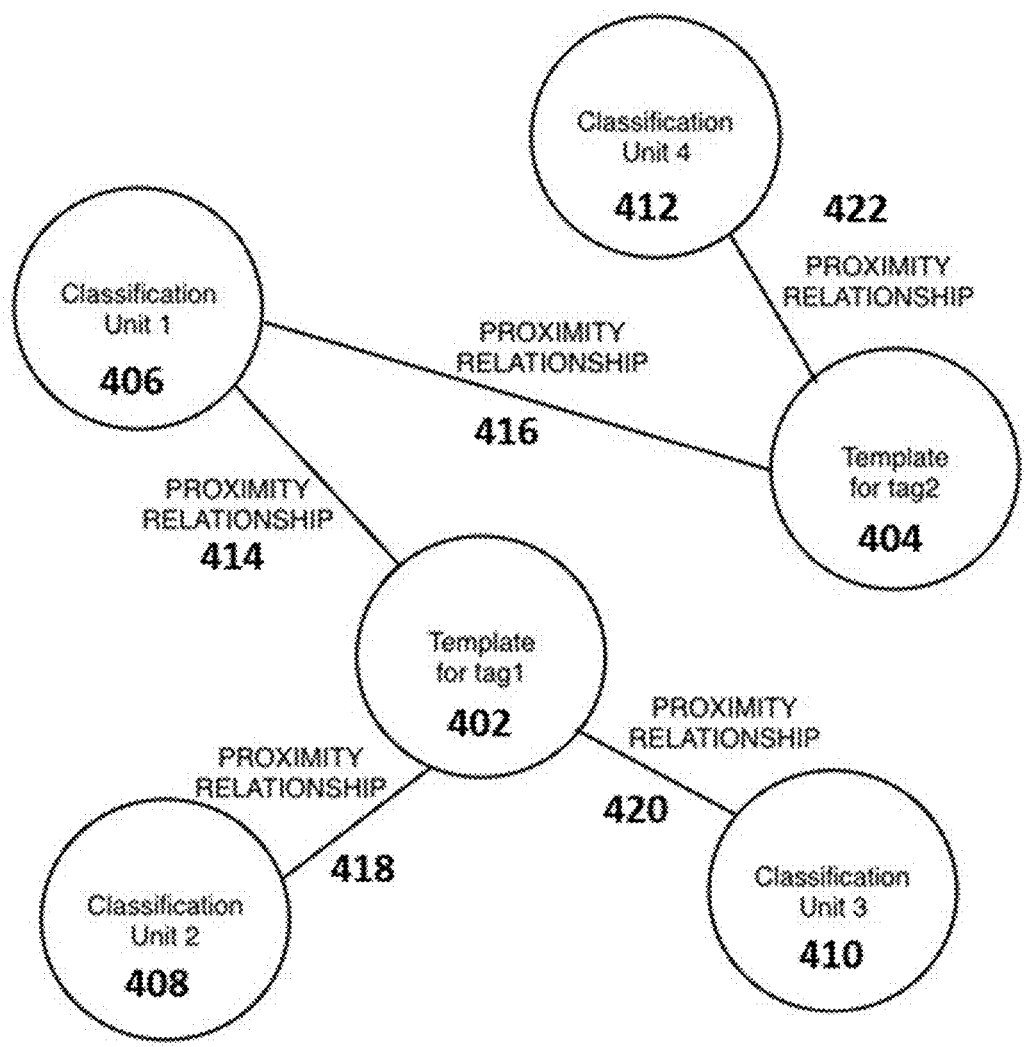
FIG. 4 shows an example of a graph database for a classification template library and a classification unit library.

In some instances, the classification unit library and/or the classification template library can be stored in a graph database. FIG. 4 shows an example of a graph database for a classification template library and a classification unit library. The graph database 400 may store classification templates (e.g., first template 402 for first tag, second template 404 for second tag, etc.), classification units (e.g., first unit 406, second unit 408, third unit 410, fourth unit 412, etc.), and proximity relationships between classification templates and classification units (e.g., proximity relationships 414, 416, 418, 420, 422, etc.). A distinction is made between the proximity relationships discussed here and the proximity scores discussed above (e.g., unit proximity score being indicative of a proximity between a classification unit and an electronic record, template proximity score being indicative of a proximity between a classification template and an electronic record).

In FIG. 4, the first template 402 has a first proximity relationship 414 with the first unit 406, a third proximity relationship 418 with the second unit 408, and a fourth proximity relationship 420 with the third unit 410. The second template 404 has a second proximity relationship 416 with the first unit 406 and a fifth proximity relationship 422 with the fourth unit 412. In this example, the first classification unit 406 is included in both the first classification template 402 and the second classification template 404.

In some instances, the graph database 400 may be specific to a user of the record management system. Alternatively, the graph database 400 can be applicable to all users of the record management system.

Proximity relationships (e.g., proximity relationships 414, 416, 418, 420, 422, etc.) between classification templates and classification units can serve at least two purposes. A proximity relationship between a classification template and a classification unit can define a relevance level between the classification unit and the classification template. In some instances, a proximity relationship between a classification template and a classification unit can be quantified, such as a proximity relationship score, and be compared against a threshold score required for an electronic record to be accepted as classified by the unit. In some instances, a proximity relationship between a classification template and a classification unit can be factored into the template proximity score formula aggregating the individual unit proximity scores. For example, unit proximity scores can be weighted by the relative proximity relationship between the classification units of the unit proximity scores and the classification template.

In some instances, the graph database 400 may further store tags (not shown in FIG. 4), proximity relationships (not shown in FIG. 4) between tags and classification templates, and/or proximity relationships (not shown in FIG. 4) between tags and classification units.

Proximity relationships between classification templates and tags can serve at least two purposes. A proximity relationship between a classification template and a tag can define a relevance level between the tag and the classification template. A proximity relationship between classification templates and tags can determine whether a classification template corresponds to the correct tag(s). In some instances, a proximity relationship between a tag and a classification template can be factored into the predetermined threshold score for tagging with the tag based on the template proximity score for the classification template. For example, if a first classification template has two corresponding tags, and the first classification template is more proximate to a first tag than a second tag, the predetermined threshold score for tagging with the first tag based on the template proximity score for the first classification template can be lower than the predetermined threshold score for tagging with the second tag based on the template proximity score for the first classification template.

Proximity relationships between classification units and tags can serve at least two purposes. A proximity relationship between a classification unit and a tag can define a relevance level between the tag and the classification unit. A proximity relationship between classification units and tags can determine whether a classification unit corresponds to the correct tag(s). In some instances, a proximity relationship between a tag and a classification unit can be factored into the unit proximity score for tagging with the tag based on the template proximity score for the classification template having the classification unit. For example, if a first classification template has two classification units, and a first classification unit is more proximate to a first tag of the first classification template than a second classification unit, the unit proximity score for the first classification unit can be weighted more than the second classification unit in determining the template proximity score for the first tag.

Beneficially, a graph database may map the proximity relationships between each of the classification templates, classification units, and tags, and use such proximity relationships to fluidly improve the accuracy of tagging with each classification cycle, such as via the methods described above (e.g., adjusting the proximity score formulas).

Figure 5:
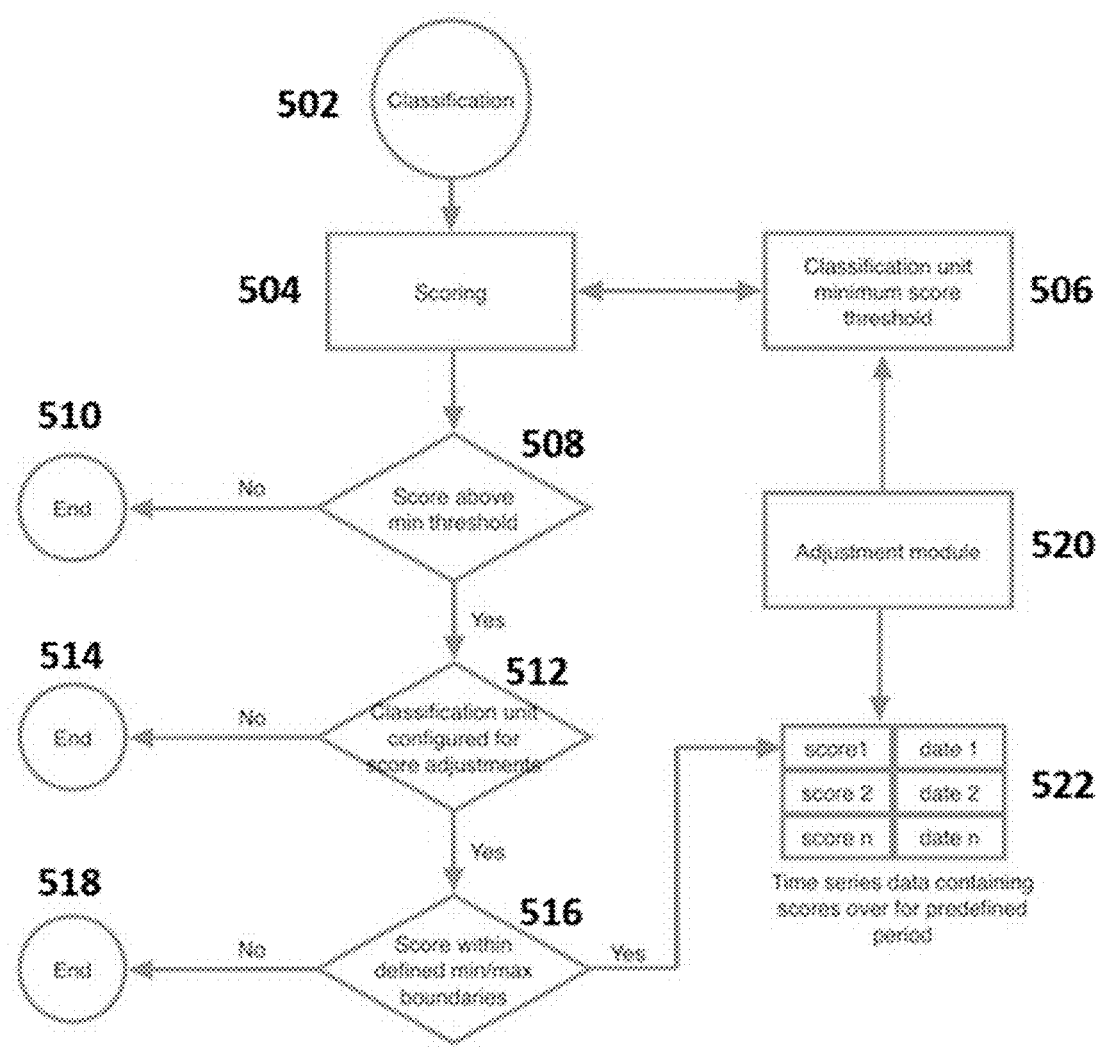
FIG. 5 illustrates a feedback loop for fine-tuning unit proximity scores from individual classification units.

A classification template may evolve over time, such as with repeated use and/or classifications. For example, the template proximity scores for the classification template can be fine-tuned automatically over time as the electronic records are classified by the one or more tags of the classification template. FIG. 5 illustrates a feedback loop for fine-tuning classification unit minimum threshold scores.

The feedback loop 500 can be applicable to classification units utilizing classification algorithms. The feedback loop may fine-tune the minimum threshold score for the classification unit. In some instances, a minimum threshold score for a classification unit may only be adjusted if the user defines the score to be "adjustable." A user may further define the boundaries of allowed adjustments. For example, the user may allow automatic adjustments of the minimum threshold score for scores between a value of 0.90 and 0.95. The feedback loop for a classification unit may be based on a time series of past scores for the classification unit. The user may define the duration of the time series. The duration can be in units of entries (e.g., 1000 entries) or time (e.g., 2 months). The user may define the frequency of adjustments. For example, for every month, the maximum value of adjustment allowed can be 0.001 up or down. Any automatic adjustments can rely on a linear regression executed on the time series data. For example, if a score is compared to the previous run and if the value is higher, the minimum threshold score can be adjusted up. Similarly, if the score is lower than the previous run, the minimum threshold score can be adjusted lower.

In FIG. 5, after classification begins 502, the classification unit can be scored 504 (e.g., unit proximity score, pattern proximity score, etc.). The score can be compared 508 to a minimum threshold score. The feedback loop may end 510 without any adjustments if the score is less than the minimum threshold score. If the score is above the minimum threshold score, the system may confirm 512 if a classification unit is configured for score adjustments, for example, if it is permitted by the user. If the classification unit is not configured for score adjustments, the feedback loop may end 514 without any adjustments. If the classification unit is configured for score adjustments, the system may confirm 516 if the score is within the defined (e.g., by the user, preprogrammed) minimum and maximum adjustment boundaries. The feedback loop may end 518 without any adjustments if the score is outside the minimum and maximum adjustment boundaries. If the score is within defined minimum and maximum adjustment boundaries, the score can be compared 522 to time series data containing scores over a predefined period. If the score is higher than a previous run, the minimum threshold score can be adjusted up by an amount determined by a linear regression of the time series data, such as by the adjustment module 520. If the score is less than a previous run, the minimum threshold score can be adjusted down. The minimum threshold score for the classification unit can thereby redefined 506.

With feedback loop adjustments, the system can adopt itself to the content that it classifies. For example, if a first classification unit in a first classification template routinely scores lower than other classification units in the first classification template and/or scores lower than other classification units in other classification templates corresponding to the same tags as the first classification template, the weight of the classification unit can be adjusted downwards when determining the template proximity score. Referring back to the graph database in FIG. 4, such routine lower scores can be indicative that the proximity relationship between the first classification unit and the first classification template is more distant relative to proximity relationships between other classification units and the first classification template. Such routine lower scores can be indicative that the proximity relationship between the first classification unit and a first tag of the first classification template is more distant relative to proximity relationships between other classification units and the first tag.

A user may manually tag electronic records in the record management system, such as without applying classification templates to the electronic records. The system can monitor when users of the system manually tag electronic records. Such manual tagging data can be used to train the system. Beneficially, because user intent for classification is directly provided during manual tagging, each instance of manual tagging of a tag can be treated as a learning opportunity for the system to identify content classified for the tag. The instance of manual tagging can be stored as training data. The training data and classification models described herein can evolve over time and increase in accuracy with repeated classification iterations.

By way of example, the system may tag an electronic record with the following metadata:

(1) {tag: "LEGAL FILES", score: "0.9", method: "A"}
(2) {tag: "LEGAL FILES", score: "1", method: "M"}

In example (1), the electronic record is tagged with the tag of "LEGAL FILES" by an automatic ("A") method, that is, by applying a classification template corresponding to the tag of "LEGAL FILES" with a template proximity score of "0.9" which passed a predetermined threshold score that was lower than 0.9. In example (2), the electronic record is tagged with the tag of "LEGAL FILES" by a manual ("M") method, that is, without applying a classification template but manually tagging with a proximity score of "1." In some instances, all manually tagged records can receive the proximity score of "1." Alternatively, where a scoring scheme has a maximum value other than 1, the manually tagged records can receive the proximity of the maximum value. Beneficially, this can also normalize the automated tagging method against the manual tagging method.

In some instances, the content of any manually tagged electronic record can be stored as training material. In some instances, the content of any automatically tagged electronic record having a template proximity score of "0.95" or higher can be stored as training material. Alternatively, the content of any automatically tagged electronic record having a template proximity score of about 0.5, 0.55, 0.6, 0.65, 0.7, 0.75, 0.8, 0.85, 0.9, 0.95, 0.96, 0.97, 0.98, 0.99 or above can be stored as training material. Alternatively, the content of any automatically tagged electronic record having a template proximity score of less than about 0.5 can be stored as training material. As will be appreciated, the threshold score for storage as training material can be accordingly scaled with different maximum score values (e.g., other than 1).

In some instances, where classification methods utilizing regular expression and/or utilizing part-of-speech tags are used for classification, the system can analyze and determine terms and combinations of terms that frequently exist in conjunction with the patterns in areas surrounding the defined patterns. This data can be stored as training material.

In some instances, training material can expire. For example, training material can expire after about 1 hour, 2 hours, 3 hours, 4 hours, 5 hours, 6 hours, 12 hours, 24 hours, 1 day, 2 days, 3 days, 4 days, 5 days, 6 days, 7 days, 1 week, 2 weeks, 3 weeks, 4 weeks, 1 month, 2 months, 3 months, 4 months, 5 months, 6 months, 1 year, 2 years, 3 years, 4 years, 5 years, 6 years, 7 years, 8 years, 9 years, 10 years, 1 decade, 2 decades, 3 decades, 4 decades, 5 decades, or longer after initial acquisition by the system. Beneficially, the record management system can be trained only by current information which is more likely to be accurate given that certain classification schemes and/or standards may evolve or change over time (e.g., a tomato can be classified as a fruit at a first point in time and classified as a vegetable at a second point in time, a politician can be classified as an advocate of environmental matters at a first point in time and classified as an advocate of educational matters at a second point in time, a business can be classified as a non-profit public interest business at a first point in time and a for profit business at a second point in time, etc.).

Computer Control Systems

Figure 6:
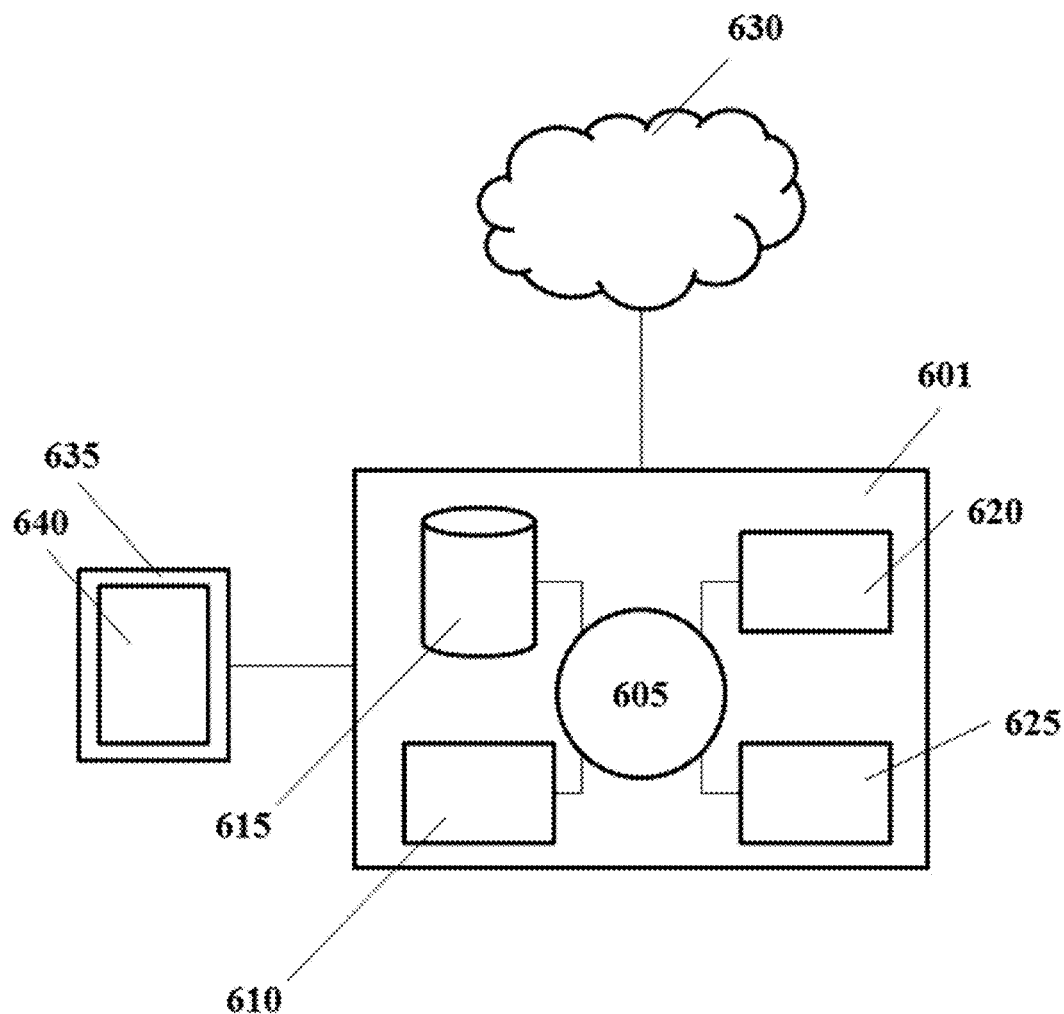
FIG. 6 shows a computer control system that is programmed to implement methods of the disclosure.

The present disclosure provides computer control systems that are programmed to implement methods of the disclosure. FIG. 6 shows a computer system 601 that is programmed or otherwise configured to classify and tag electronic tags, define and/or receive definitions for classification templates, define and/or receive definitions for classification units, compute classification formulas, determine unit proximity scores, determine template proximity scores, compare predetermined threshold scores, create, navigate, and/or expand a graph database, determine proximity relationships between tags, classification templates, and classification units, determine training material, machine learning of classification and tagging, and operate a record management system, among other operations. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The processor 605 can be a controller, microprocessor and/or a microcontroller. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user (e.g., user of the record management system). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for users to provide, for example, instructions to the record management system, and/or the record management system to be presented as a user-manageable interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, classify one or more electronic records via one or more classification methods described herein, tag electronic tags, define and/or receive definitions for classification templates, define and/or receive definitions for classification units, compute classification formulas, determine unit proximity scores, determine template proximity scores, compare predetermined threshold scores, create, navigate, and/or expand a graph database, determine proximity relationships between tags, classification templates, and classification units, determine training material, train a record management system for automatic classification and tagging, expire training material after an expiration date, and otherwise operate a record management system, among other operations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for classifying a record based on an area or region of the record, comprising:
   (a) accessing, with aid of one or more computer processors, a library of classification templates, wherein each classification template of the library of classification templates comprises one or more tags and one or more classification units, wherein a classification unit comprises (i) the area or region of the record and (ii) a textual classification method selected from a plurality of textual classification methods, wherein the textual classification method is at least one member selected from the group consisting of (1) a pattern of regular expression, (2) a pattern of part-of-speech, and (3) one or more classification algorithms;
   (b) matching the record with a first classification template of the library of classification templates;
   (c) scanning the area or region of the record;
   (d) applying the textual classification method of the first classification template to textual content disposed in the area or region of the record;
   (e) determining a template proximity score for the first classification template for the record, wherein the template proximity score is based at least in part on the textual classification method of the classification template applied to textual content disposed in the area or region in the record; and
   (f) assigning the one or more tags of the first classification template to the record based at least in part on the template proximity score.

2. The method of claim 1, further comprising repeating (b)-(f) for a second classification template of the library of classification templates, wherein the second classification template comprises a second classification unit comprising a second textual classification method different from the textual classification method.

3. The method of claim 1, wherein the one or more tags of the first classification template is assigned to the record if the template proximity score is greater than a predetermined threshold score.

4. The method of claim 1, wherein at least two classification templates share the same classification unit.

5. The method of claim 1, further comprising determining a unit proximity score for each classification unit in the first classification template, wherein the unit proximity score is based at least in part on the textual classification method of the classification unit applied to textual content disposed in the area or region of the classification unit in the record, and wherein the template proximity score is an aggregate of the unit proximity scores determined for each classification unit.

6. The method of claim 5, wherein the unit proximity score is binary.

7. The method of claim 1, further comprising:
   receiving instructions for assigning a first tag to the record from a user;
   assigning the first tag to the record;
   storing, in one or more databases, content of the record as training material for classifying as the first tag; and
   learning a classification method of records as the first tag from the training material.

8. The method of claim 1, wherein the library of classification templates is accessed from a graph database, wherein the graph database comprises the library of classification templates and a library of classification units.

9. The method of claim 1, wherein matching the record with the first classification template of the library of classification templates comprises, for each classification unit of the first classification template, applying the textual classification method of the each classification unit to textual content disposed in the area or region of the record of the each classification unit.

10. A computer system for classifying a record based on an area or region of the record, comprising:
    one or more processors; and
    a memory, communicatively coupled to the one or more processors, including instructions executable by the one or more processors, individually or collectively, to implement a method for classifying a record based on the area or region of the record, the method comprising:
    (a) receiving, from a user, over a computer network, a definition for a classification template, wherein a classification template is defined by one or more tags and one or more classification units, wherein a classification unit is defined by at least (i) an area or region of the record and (ii) a textual classification method selected from a plurality of textual classification methods, wherein the textual classification method is at least one member selected from the group consisting of (1) a pattern of regular expression, (2) a pattern of part-of-speech, and (3) one or more classification algorithms;
    (b) matching the record with the classification template;
    (c) applying the textual classification method of the classification template to textual content disposed in the area or region of the record;
    (d) determining a template proximity score for the classification template for the record, wherein the template proximity score is based at least in part on the textual classification method of the classification template applied to textual content disposed in the area or region of the record; and (e) assigning the one or more tags of the classification template to the record based at least in part on the template proximity score.

11. The computer system of claim 10, wherein the method further comprises repeating determining a unit proximity score for each classification unit in the classification template, wherein the unit proximity score is based at least in part on the textual classification method of the classification unit applied to textual content disposed in the area or region of the classification unit in the record, and wherein the template proximity score is an aggregate of the unit proximity scores determined for each classification unit.

12. The computer system of claim 10, wherein the one or more tags of the first classification template is assigned to the record if the template proximity score is greater than a predetermined threshold score.

13. The computer system of claim 10, wherein the classification unit further comprises a page index and dimensions.

14. The computer system of claim 10, wherein the method further comprises displaying, on a graphical user interface, one or more pages of the record.

15. The computer system of claim 14, wherein the definition is received from the graphical user interface.

16. The computer system of claim 15, wherein a definition for the area or region of the record is displayed over the one or more pages of the record on the graphical user interface.

17. The computer system of claim 10, wherein the method further comprises:
   receiving instructions for assigning a first tag to the record from a user;
   assigning the first tag to the record;
   storing, in one or more databases, content of the record as training material for classifying as the first tag; and
   learning a classification method of records as the first tag from the training material.

18. The computer system of claim 10, wherein the library of classification templates is accessed from a graph database, wherein the graph database comprises the library of classification templates and a library of classification units.

* * * * *